United States Patent
Jung et al.

(10) Patent No.: US 10,644,346 B2
(45) Date of Patent: May 5, 2020

(54) ELECTRODE FOR ELECTROCHEMICAL DEVICE AND METHOD FOR MANUFACTURING ELECTRODE

(71) Applicant: LG Chem, Ltd., Seoul (KR)

(72) Inventors: Hye-Ran Jung, Daejeon (KR); Hyeok-Moo Lee, Daejeon (KR); Hyo-Sik Kim, Daejeon (KR); Song-Taek Oh, Daejeon (KR)

(73) Assignee: LG Chem, Ltd. (KR)

( * ) Notice: Subject to any disclaimer, the term of this patent is extended or adjusted under 35 U.S.C. 154(b) by 263 days.

(21) Appl. No.: 15/548,951

(22) PCT Filed: Apr. 27, 2016

(86) PCT No.: PCT/KR2016/004422
§ 371 (c)(1),
(2) Date: Aug. 4, 2017

(87) PCT Pub. No.: WO2016/175560
PCT Pub. Date: Nov. 3, 2016

(65) Prior Publication Data
US 2018/0097255 A1    Apr. 5, 2018

(30) Foreign Application Priority Data

Apr. 29, 2015    (KR) .......................... 10-2015-0060851

(51) Int. Cl.
*H01M 10/0525*    (2010.01)
*H01M 4/04*    (2006.01)
(Continued)

(52) U.S. Cl.
CPC .......... *H01M 10/0525* (2013.01); *H01M 4/04* (2013.01); *H01M 4/13* (2013.01);
(Continued)

(58) Field of Classification Search
CPC ............ H01M 10/0525; H01M 4/133; H01M 4/1393; H01M 4/366; H01M 4/587; H01M 4/622
See application file for complete search history.

(56) References Cited

U.S. PATENT DOCUMENTS

| | | | |
|---|---|---|---|
| 2005/0266150 A1 | 12/2005 | Yong et al. | |
| 2011/0168550 A1* | 7/2011 | Wang ................ | H01M 4/0419 204/290.12 |

(Continued)

FOREIGN PATENT DOCUMENTS

| | | |
|---|---|---|
| JP | 2011029075 A | 2/2011 |
| JP | 2011238504 A | 11/2011 |

(Continued)

OTHER PUBLICATIONS

Search report from International Application No. PCT/KR2016/004422, dated Aug. 8, 2016.

*Primary Examiner* — Matthew T Martin
(74) *Attorney, Agent, or Firm* — Lerner, David, Littenberg, Krumholz & Mentlik, LLP (57) ABSTRACT

The present invention relates to an electrode for an electrochemical device and a method for manufacturing the same. More specifically, the present invention relates to an electrode for an electrochemical device having excellent electrolyte impregnation and improved battery output and lifecycle properties, and a method for manufacturing the electrode. The electrode according to the present invention enables an electrolyte to easily permeate into the electrode, thereby remarkably improving a lifecycle property or an output property due to high electrolyte impregnation. In addition, the method for manufacturing an electrode, according to the present invention, does not cause the deterioration of porosity of a lower electrode active material monolayer, (Continued)

the deterioration being caused by a step performed during the formation of an upper electrode active material monolayer.

16 Claims, 6 Drawing Sheets

(51) Int. Cl.
*H01M 10/0585* (2010.01)
*H01M 4/13* (2010.01)
*H01M 10/04* (2006.01)
*H01M 4/133* (2010.01)
*H01M 4/1393* (2010.01)
*H01M 4/36* (2006.01)
*H01M 4/587* (2010.01)
*H01M 4/62* (2006.01)

(52) U.S. Cl.
CPC ......... *H01M 4/133* (2013.01); *H01M 4/1393* (2013.01); *H01M 4/366* (2013.01); *H01M 4/587* (2013.01); *H01M 4/622* (2013.01); *H01M 10/04* (2013.01); *H01M 10/0585* (2013.01)

(56) References Cited

U.S. PATENT DOCUMENTS

| | | | |
|---|---|---|---|
| 2011/0177398 | A1 | 7/2011 | Affinito et al. |
| 2011/0250485 | A1 | 10/2011 | Tsukuda |
| 2012/0139393 | A1 | 6/2012 | Choi et al. |
| 2013/0170100 | A1 | 7/2013 | Lee et al. |
| 2014/0170486 | A1 | 6/2014 | Matsumura et al. |
| 2014/0287316 | A1 | 9/2014 | Ahn et al. |
| 2015/0064556 | A1 | 3/2015 | Lee et al. |

FOREIGN PATENT DOCUMENTS

| | | |
|---|---|---|
| JP | 2013041819 A | 2/2013 |
| JP | 2014035886 A | 2/2014 |
| JP | 2014041767 A | 3/2014 |
| KR | 20120063318 A | 6/2012 |
| KR | 20120093487 A | 8/2012 |
| KR | 101214727 B1 | 12/2012 |
| KR | 20130115768 A | 10/2013 |
| KR | 20140095980 A | 8/2014 |
| KR | 20150027686 A | 3/2015 |
| WO | 2014116029 A1 | 7/2014 |
| WO | 2014149766 A1 | 9/2014 |

\* cited by examiner

ELECTRODE FOR ELECTROCHEMICAL DEVICE AND METHOD FOR MANUFACTURING ELECTRODE

CROSS-REFERENCE TO RELATED APPLICATION

The present application is a national phase entry under 35 U.S.C. § 371 of International Application No. PCT/KR2016/004422 filed Apr. 27, 2016, which claims priority from Korean Patent Application No. 10-2015-0060851 filed on Apr. 29, 2015, all of which are incorporated herein by reference.

TECHNICAL FIELD

The present disclosure relates to an electrode for an electrochemical device and a method for manufacturing the same. More particularly, the present disclosure relates to an electrode for an electrochemical device with excellent electrolyte solution impregnation and improved battery output and cycling characteristics and a method for manufacturing the electrode.

BACKGROUND ART

With the technology development and growing demand for mobile devices, secondary batteries as an eco-friendly alternative energy source are in ever increasing demand. Recently, secondary batteries are being used as a power source for devices requiring high capacity power, for example, electric vehicles (EVs) and hybrid electric vehicles (HEVs), and their application is expanding to the use as auxiliary power through the grid.

For the use as a power source for devices requiring high capacity power, because secondary batteries must achieve high output in a short time and be used for 10 years or longer under harsh conditions of repeated charge and discharge with a large current for a short time, high energy density, outstanding safety, and long-term life characteristics are absolutely required.

Existing secondary batteries generally use lithium metal for the negative electrode, but since shorted batteries caused by dendrite formation and consequential explosion risks were reported, carbon-based compounds replace lithium metal because carbon-based compounds allow reversible intercalation and deintercalation of lithium ions while maintaining structural and electrical properties.

Figure 1:
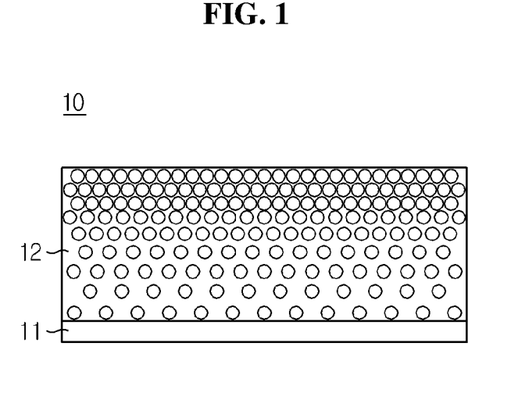
FIG. 1 shows a cross section of an electrode for an electrochemical device according to the related art.

Carbon-based compounds have a very low discharge potential of about −3V on the basis of standard hydrogen electrode potential, and due to uniaxial orientation of a graphene layer, they exhibit extremely reversible charge/discharge behaviors and have outstanding electrode cycle life characteristics. Furthermore, an electrode potential is 0V for Li/Li+ during Li ion charging, and the potential is nearly similar to pure lithium metal, so an advantage is that higher energy is provided when a battery is made of an oxide-based positive electrode together. The negative electrode for a secondary battery is manufactured by a method which mixes a negative electrode active material 13 or carbon material with, if necessary, conductive material and binder to prepare a negative electrode active material slurry, applies a layer of the slurry to an electrode current collector 11 such as a copper foil and dries the slurry. In this instance, when applying the slurry, a press process is performed to compress active material powder onto the current collector and achieve uniform electrode thickness.

However, in the conventional electrode press process, stronger pressure is applied to the surface of the negative electrode active material than the inside, and the pore volume fraction on the surface reduces. This phenomenon is worse as the electrode is thicker, and permeation of an electrolyte solution into the electrode is poor and channels for ion movement are insufficient to achieve smooth ion movement, resulting in degradation in battery performance and life characteristics.

On the other hand, when an electrode is composed of a layer of active material as conventionally, the layer of negative electrode active material is soft and vulnerable to stress, and due to these properties, the pressure cannot be transmitted to the inside of the electrode and only the negative electrode active material disposed on the electrode surface is strongly pressed during a press process. For example, when an electrode is only formed from a layer of active material having a low press density and a large average particle size, the layer of negative electrode active material is vulnerable to stress, and due to these properties, only the negative electrode active material disposed on the electrode surface is strongly pressed during a press process. As a result, pore spaces in the negative electrode active material near the electrode surface reduce and migration of ions toward the electrode reduces. This phenomenon will be worse if the negative electrode is thicker or denser.

DISCLOSURE

Technical Problem

The present disclosure is designed to solve the aforementioned problems of the related art, and the present disclosure is directed to providing an electrode for an electrochemical device with excellent electrolyte solution impregnation and improved cycling characteristics and output characteristics. Further, the present disclosure is directed to providing a method for manufacturing the electrode. These and other objects and advantages of the present disclosure can be understood by the following detailed description. Furthermore, it will be readily understood that the objects and advantages of the present disclosure can be realized by the means and method set forth in the appended claims and combinations thereof.

Technical Solution

To achieve the object, the present disclosure provides an electrode for an electrochemical device. The electrode according to the present disclosure includes an electrode current collector and an electrode active material layer formed on at least one surface of the electrode current collector, wherein the electrode active material layer includes an electrode active material and has porosity of from 20% to 55%, and the electrode active material layer has a layered structure in which a plurality of active material monolayers is stacked on one another, with a barrier layer including polymer resin between each active material monolayer.

Here, the electrode active material layer may increase in porosity stepwise and/or gradually from a surface of the electrode current collector along a thickness-wise direction of the active material layer.

Here, the electrode active material layer may have a layered structure in which a lowermost electrode monolayer (a first monolayer) is formed on a surface of the electrode current collector, and a subsequent layer (a second monolayer) to an $n^{th}$ electrode monolayer or an uppermost electrode monolayer are formed on an upper surface of the lowermost electrode monolayer, where n is an integer greater than 1, so that n electrode active material monolayers are stacked on the surface of the current collector in a sequential order, and porosity may increase stepwise and/or gradually from the lowermost electrode monolayer toward the uppermost electrode monolayer along a thickness-wise direction of the electrode.

Here, the lowermost electrode monolayer may have porosity of between 20% and 40%.

Furthermore, in the present disclosure, the uppermost electrode monolayer may have porosity of between 30% and 50%.

Furthermore, in the present disclosure, 90% or more of pores in the uppermost electrode monolayer may have a pore diameter of between 10 μm and 20 μm on the basis of longest pore diameter.

In the present disclosure, the electrode active material layer may have a press strength of particles increasing stepwise and/or gradually from the lowermost electrode monolayer toward the uppermost electrode monolayer along a thickness-wise direction of the electrode.

Here, the electrode active material layer may have a diameter of particles increasing stepwise and/or gradually from the lowermost electrode monolayer toward the uppermost electrode monolayer along a thickness-wise direction of the electrode.

Here, the barrier layer may include at least one polymer resin selected from the group consisting of styrenebutadiene rubber, acrylonitrile-butadiene rubber, acrylonitrile-butadiene-styrene rubber, carboxymethylcellulose (CMC), hydroxyropylmethylcellulose, polyvinylalcohol, hydroxypropylcellulose, and diacetylcellulose.

Furthermore, in the present disclosure, the barrier layer may have a thickness of between 0.5 μm and 5 μm.

Furthermore, the polymer resin may have a glass transition temperature of between −60° C. and 55° C.

Here, the polymer resin may have a boiling point of between 160° C. and 250° C.

Furthermore, the present disclosure provides an electrode assembly for an electrochemical device, including a negative electrode, a positive electrode, and a separator interposed between the negative electrode and the positive electrode, wherein the negative electrode and/or the positive electrode has the aforementioned feature. Furthermore, the present disclosure provides an electrochemical device including the electrode assembly.

On the other hand, the present disclosure provides a method for manufacturing an electrode for an electrochemical device, including the steps of (S1) preparing a stack including an electrode current collector and an active material monolayer formed on an upper surface of the electrode current collector, (S2) forming a barrier layer on an upper surface of the active material monolayer, (S3) applying a slurry for forming active material monolayer on an upper surface of the barrier layer formed in the (S2) and drying the slurry, and (S4) pressing the dried slurry to form an electrode active material monolayer.

Here, the pressing of (S4) may be performed by a hot pressing method under condition of between 80° C. and 120° C.

Furthermore, here, porosity of a lower electrode active material monolayer may be lower than porosity of an upper electrode active material monolayer.

Advantageous Effects

The electrode according to the present disclosure, into which an electrolyte solution can easily penetrate, has noticeably improved cycling characteristics or output characteristics due to high electrolyte solution impregnation. Furthermore, the electrode manufacturing method according to the present disclosure prevents a porosity reduction in a lower electrode active material monolayer due to a process performed when forming an upper electrode active material monolayer.

BRIEF DESCRIPTION OF DRAWINGS

The accompanying drawings illustrate preferred embodiments of the present disclosure, and together with the detailed description, serve to provide an explanation of the principle of the present disclosure, but not intended to limit the scope of the present disclosure thereto. On the other hand, the shape, size, scale or proportion of elements in the drawings as stated herein may be exaggerated for clarity.

MODE FOR CARRYING OUT THE INVENTION

Hereinafter, the present disclosure will be described in detail.

The terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Accordingly, the embodiments stated herein and illustrations in the drawings are just the most preferred embodiment of the present disclosure, and do not represent all the technical aspects of the present disclosure, so it should be understood that many equivalents and modifications could be made as alternatives thereto at the time the application is filed.

Figure 2:
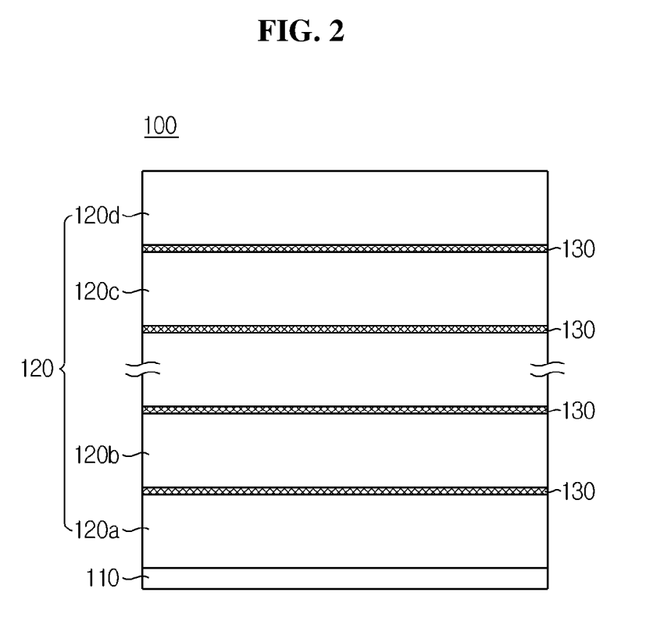
FIGS. 2 and 3 schematically show a cross section of an electrode for an electrochemical device according to a specific embodiment of the present disclosure.

The present disclosure relates to an electrode for an electrochemical device, characterized in that an electrode active material layer has a layered structure in which a plurality of active material monolayers having different porosities is stacked on one another. FIG. 2 is a diagram schematically showing a cross section of the electrode for an electrochemical device according to a specific embodiment of the present disclosure. The structure of the electrode according to the present disclosure is described with reference to FIG. 2.

Electrode Active Material Layer and Each Electrode Active Material Monolayer

In the present disclosure, the electrode 100 includes an electrode current collector 110 and an electrode active material layer 120 formed on at least one surface of the electrode current collector. The electrode may be a negative electrode and/or a positive electrode. That is, an electrode structure having characteristics according to the present disclosure may be applied to either a negative electrode or a positive electrode in a battery or both.

In the present disclosure, the electrode active material layer has porosity of between about 20% and about 55%, or between about 20% and about 45%, or between about 25% and about 40%.

In the present disclosure, the term "porosity" refers to a ratio of the volume occupied by pores to the total volume in a structure and is indicated in %, and may be interchangeably used with a void ratio and void fraction.

In the present disclosure, porosity measurement is not limited to a particular method, and according to an embodiment of the present disclosure, the porosity may be measured by, for example, Brunauer-Emmett-Teller (BET) measurement method or Hg porosimeter.

In the present disclosure, the electrode active material layer 120 is a stack of two or more active material monolayers 120a, 120b, 120c . . . on top of one another, and the stack includes a barrier layer 130 formed between each active material monolayer.

The electrode active material layer of the present disclosure has a layered structure in which a first electrode active material monolayer is formed on the surface of an electrode current collector and second to $n^{th}$ (here, n is an integer greater than 1) layers are formed on the upper surface of the first electrode active material monolayer, so that n electrode active material monolayers are stacked on the surface of the current collector in a sequential order.

In the present disclosure, each active material monolayer of the electrode active material layer has different porosities. According to a preferred embodiment of the present disclosure, the electrode active material layer increases in porosity stepwise and/or gradually as it goes upwards along the thickness-wise direction of the electrode from an active material monolayer adjacent to the surface of the electrode current collector.

In the present disclosure, the first electrode monolayer has low porosity in the electrode active material layer, the $n^{th}$ electrode monolayer has the highest porosity, and the porosity of second to $n-1^{th}$ layers has values between the porosity of the first layer and the porosity of the $n^{th}$ layer, and preferably, the porosity value increases gradually and/or stepwise from the second layer to the $n-1^{th}$ layer along the thickness-wise direction. Most preferably, in two adjacent electrode active material monolayers of the electrode active material layer, porosity of a lower electrode monolayer is lower than porosity of an upper electrode monolayer.

In the specification, the direction and/or position, for example, up/down/left/right, is indicated on the basis of the illustrations in the accompanying drawings, and accordingly, the relative position of the active material monolayers is described herein. However, the expressions representing the direction and/or position, for example, up/down/left/right are for easily explaining the invention having a three-dimensional structure, and denote the relative direction and/or position, but not intended to limit the absolute direction and/or position.

Figure 3:
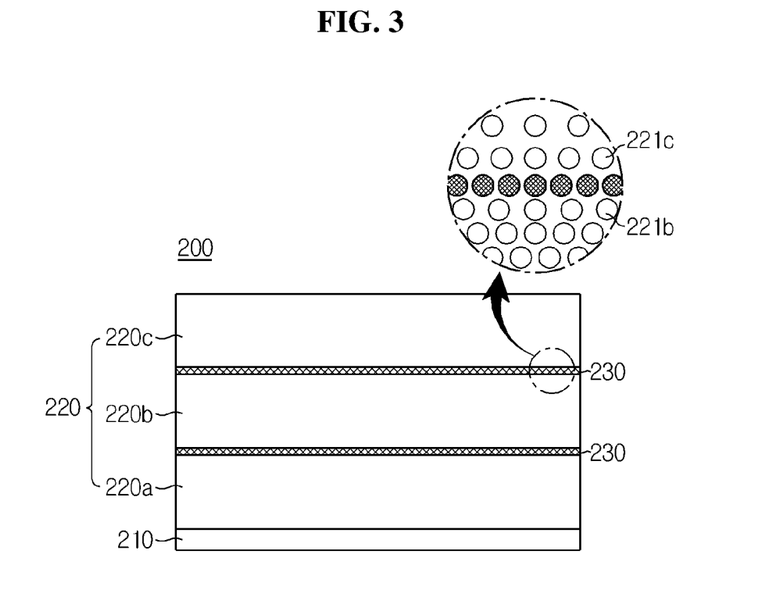

FIG. 3 shows a specific embodiment of the electrode for an electrochemical device according to the present disclosure, in which the electrode has three electrode active material monolayers and barrier layers between each monolayer for illustrative purposes. In the electrode active material layer, the porosity of each active material monolayer tends to increase stepwise and/or gradually upwards from an electrode monolayer (a lowermost electrode monolayer) adjacent to the current collector along the thickness-wise direction.

The porosity of the uppermost electrode monolayer in the electrode active material layer is between 30% and 50%, or between 35% and 45%. When the porosity is lower than the range, an electrolyte solution cannot flow in through the pores of the electrode surface quickly and the time required for initial activation increases, failing to reach a predetermined amount of electrolyte solution fed, resulting in degradation in battery cycling characteristics or output characteristics. On the contrary, when the porosity significantly exceeds the range, the mechanical strength of the electrode surface reduces and active material particles are more likely to fall off by external impacts.

Furthermore, the present disclosure has the porosity of the lowermost electrode monolayer of between 20% and 40%, or between 25% and 35%. When the porosity is lower than the range, the lowermost electrode monolayer has an excessively high packing density of active materials and an electrolyte solution cannot be present in sufficient amounts to achieve ionic conduction and/or electrical conduction between active materials, resulting in degradation in output characteristics or cycling characteristics. On the contrary, when the porosity is too high beyond the range, mechanical and electrical connection with the current collector reduces and adhesion decreases, causing less reaction.

In the electrode active material layer, the porosity of the intermediate electrode monolayer may be equal to the porosity of the lowermost electrode monolayer or the porosity of the uppermost electrode monolayer, or may have values between the porosity of the lowermost electrode monolayer and the porosity of the uppermost electrode monolayer.

In the present disclosure, a porosity gradient of the active material layer can be obtained by varying the size and distribution of the pores in each active material monolayer.

In the present disclosure, in two adjacent electrode active material monolayers of the electrode active material layer, the pore size of an upper monolayer is larger than the pore size of a lower monolayer.

In a specific embodiment of the present disclosure, about 90% or more of the pores of the uppermost electrode monolayer are mesopores having a pore diameter of between 10 μm and 20 μm on the basis of longest pore diameter. Furthermore, mesopores that lie within the range are less than about 50% of the pores of the lowermost electrode monolayer.

Furthermore, in the present disclosure, the porosity may be influenced by the size of active material particles in each electrode monolayer. According to a specific embodiment of the present disclosure, the electrode active material monolayers have different particle size distributions, and in two adjacent electrode active material monolayers of the electrode active material layer, an average particle size D50 of active material particles in an upper monolayer is larger than an average particle size D50 of active material particles in a lower monolayer.

Furthermore, in a specific embodiment of the present disclosure, the press strength of active material particles in the upper electrode monolayer is greater than the press strength of active material particles in the lower electrode monolayer. As the particle strength increases, the particles are less pressed down under the same pressure and the press density of an electrode is low. Thus, when the press strength of active material particles in the upper monolayer is great, the particles are less pressed down, and thus, porosity of an electrode can be still maintained at high levels after the press process in the manufacture of the electrode.

The press strength is a measure of the extent to which particles of active material deform, and when pressed under the same pressure, as the press strength value is lower, the compression strength is better. The press density may be measured using, for example, Mitsubishi chemical's powder resistivity measurement system MCP-PD51. The powder resistivity measurement system measures the density when particles are pressed down by continuously applying a force to a predetermined amount of active material powder introduced into a cylinder type load cell.

As described above, the electrode active material layer of the present disclosure can form an interlayer gradient in porosity of each layer by using active material particles having different particle size and/or press density, and the interlayer gradient in porosity reduces stepwise from the uppermost electrode monolayer toward the lower electrode monolayer in the electrode active material layer.

Furthermore, the present disclosure can improve a wetting rate of electrolyte solution and the transport rate of lithium ions because of the porosity of the upper monolayer higher than that of the lower monolayer. The present disclosure can prevent damage of the negative electrode active material layer in the press process and improve the pore structure in the electrode.

Barrier Layer

In the present disclosure, the barrier layer is formed between each electrode active material monolayer, and when an upper electrode active material monolayer is formed on the upper surface of the barrier layer, structure deformation of a lower monolayer is prevented. For example, when an upper monolayer is formed on a lower monolayer, during a coating process on the upper monolayer, a binder in the lower monolayer melts and the lower monolayer changes in composition, resulting in structure deformation and/or destruction. Thus, the electrode according to the present disclosure includes the barrier layer between each active material monolayer to maintain the composition of the lower monolayer and prevent the structure deformation and/or destruction. The barrier layer includes polymer resin. In the present disclosure, the polymer resin is an aqueous polymer resin, and preferably an aqueous polymer resin having a binding property to bind the upper and lower monolayers together. The aqueous polymer resin is not limited to a particular type and includes any polymer resin dispersed in a predetermined size in an aqueous system (water), and may be polymer particles formed by dispersion polymerization, emulsion polymerization or suspension polymerization.

The aqueous polymer resin includes, but is not limited to, one selected from styrenebutadiene rubber, acrylonitrile-butadiene rubber, acrylonitrile-butadiene-styrene rubber, carboxymethylcellulose (CMC), polyacrylic acid (PAA), hydroxypropylmethylcellulose, polyvinylalcohol, hydroxypropylcellulose and diacetylcellulose, or combinations thereof. The aqueous polymer resin has the glass transition temperature of between −60° C. and 55° C. or between −50° C. and 45° C. Furthermore, the aqueous binder has a boiling point of between 160° C. and 250° C. or between 170° C. and 240° C. When the boiling point of the polymer resin is lower than the range, the polymer resin melts during the press process of the upper active material monolayer and the melted polymer resin penetrates in the pores of the lower electrode active material monolayer, unfortunately causing the pores of the lower electrode monolayer to become clogged.

In the present disclosure, the barrier layer may be formed with a thickness of between 0.5 μm and 5 μm or between 1 μm and 2 μm.

Figure 4:
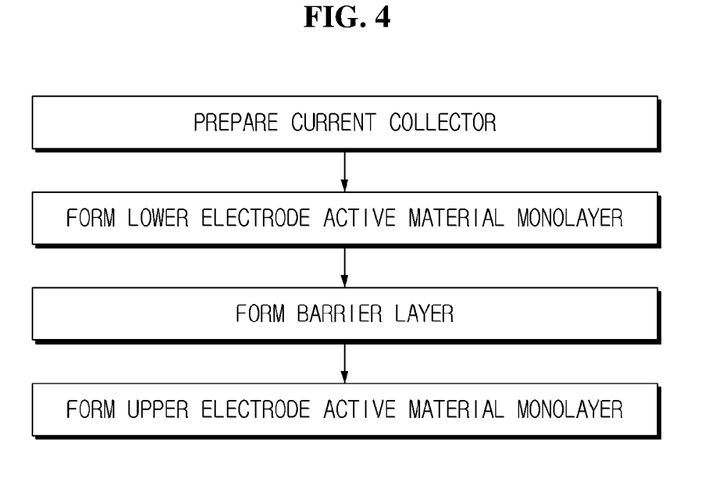
FIG. 4 is a process flowchart of a method for manufacturing an electrode for an electrochemical device according to the present disclosure.

According to a specific embodiment of the present disclosure, because the barrier layer is composed of polymer particles and has porous properties, it does not inhibit the flow-in or flow-out of an electrolyte solution or the conduction of ions and electrons. FIG. 4 shows a cross section of the electrode active material layer having the barrier layer.

In the present disclosure, the negative electrode may include a negative electrode active material, a binder, and a conductive material, and may further various types of additives, for example, a dispersant, to improve the properties of the negative electrode.

The negative electrode active material may include a carbon-based material. The carbon-based material includes, without limitation, any type of carbon-based material capable of intercalation and deintercalation of lithium ions. Non-limiting examples of the carbon-based material include low crystalline carbon selected from the group consisting of soft carbon and hard carbon; or at least one high crystalline carbon selected from the group consisting of natural graphite, kish graphite, pyrolytic carbon, mesophase pitch based carbon fiber, meso-carbon microbeads, mesophase pitches and petroleum or coal tar pitch derived cokes.

In the present disclosure, the positive electrode may include a positive electrode active material, a binder, and a conductive material, and may further include various types of additives, for example, a dispersant, to improve the properties of the positive electrode.

The positive electrode active material preferably includes, for example, one selected from the group consisting of $LiMn_2O_4$, $LiCoO_2$, $LiNiO_2$, $LiFeO_2$ and $V_2O_5$, or mixtures thereof. Furthermore, TiS, MoS, organic disulfide compound or organic polysulfide compound that is capable of intercalation and deintercalation of lithium is preferably available.

The binder includes polyvinylidenefluoride, carboxymethylcellulose, methylcellulose, and sodium polyacrylate, and the conductive material includes conductive material, for example, acetylene black, furnace black, graphite, carbon fiber, and fullerene.

In the present disclosure, the electrode current collector includes one selected from the group consisting of stainless steel; aluminum; nickel; titanium; calcined carbon; copper; stainless steel surface-treated with carbon, nickel, titanium or silver (Ag); aluminum-cadmium alloy; non-conductive polymer surface-treated with conductive material; and conductive polymer, or mixtures thereof.

Figure 5:
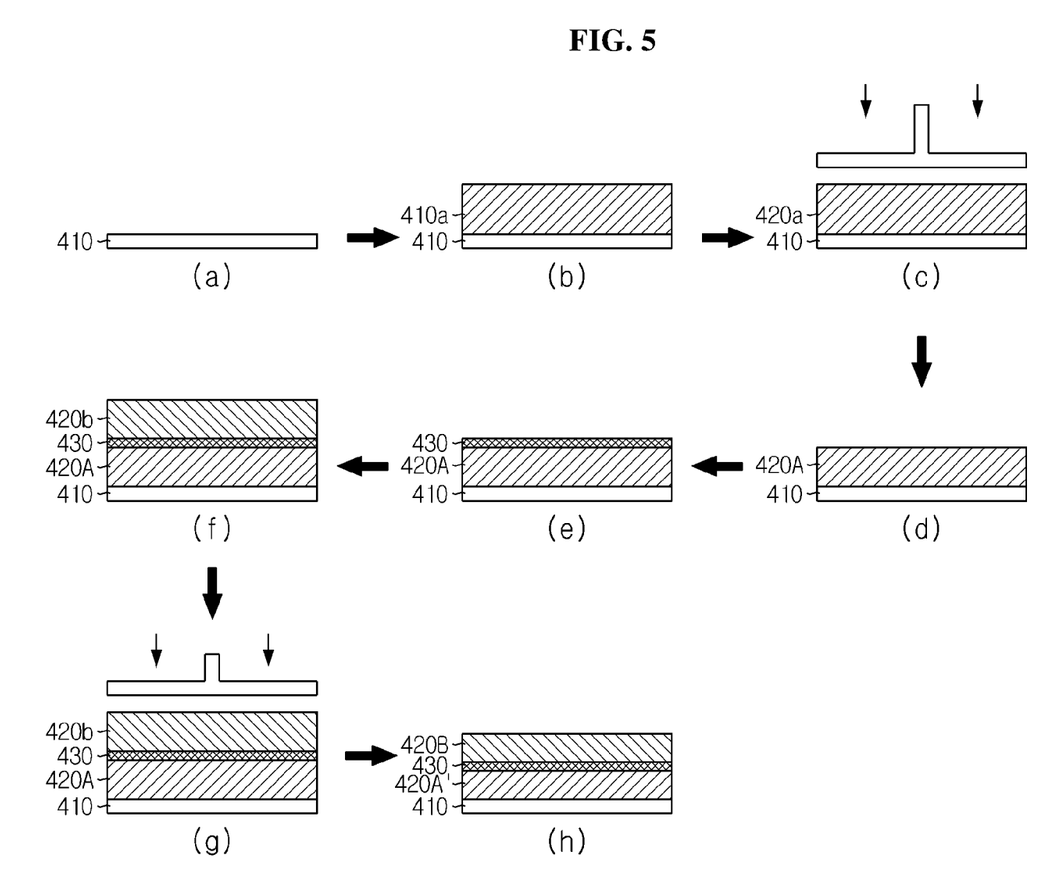
FIG. 5 diagrammatically shows an electrode manufacturing process according to a specific embodiment of the present disclosure.

The present disclosure provides a method for manufacturing the electrode. FIGS. 5a to 5f diagrammatically show the electrode manufacturing method of the present disclosure. Hereinafter, the electrode manufacturing method is described in detail with reference to FIGS. 5a to 5f.

First, a current collector is prepared (FIG. 5a), and a slurry for lower electrode active material monolayer is applied to a surface of the current collector and dried (FIG. 5b). The slurry may be prepared by adding an electrode active material and a conductive material to a binder solution in which binder resin is put in a proper solvent and mixed. Subsequently, the dried slurry is pressed (FIG. 5c) to form a lower electrode active material monolayer (FIG. 5d). As described below, because a press process is performed when forming an upper electrode monolayer, causing the porosity of the lower electrode monolayer to reduce, the lower electrode monolayer is formed with higher porosity than that of a final lower monolayer.

Subsequently, a water-borne binder solution containing dispersed organic polymer particles in an aqueous solvent is prepared, and the solution is applied to the surface of a first active material monolayer and dried to form a barrier layer (FIG. 5e).

Subsequently, a slurry for upper electrode active material monolayer is applied to the upper surface of the barrier layer (FIG. 5f), and is dried and pressed (FIG. 5g) to form an upper electrode monolayer (FIG. 5h). Because a press process for the upper electrode monolayer is performed over the entire electrode active material layer, heat and pressure is applied to the lower electrode monolayer again by the pressing and the lower monolayer has a higher packing density of active material particles than the upper monolayer, and accordingly, the upper monolayer has higher porosity than the lower monolayer. The pressing is preferably performed under the condition of between about 80° C. and 120° C., taking into account the boiling point of the binder resin in the barrier layer and the lower electrode monolayer.

Subsequently, a barrier layer and another upper monolayer may be formed on the upper surface of the upper monolayer, and barrier layer formation and upper active material monolayer formation may be performed a predetermined number of repetitions according to the design of the electrode active material layer.

As described above, in the present disclosure, the electrode active material layer may have a porosity gradient between each active material layer based on the number of press processes performed. According to the method, when each electrode monolayer uses an electrode active material having the same particle size, press density and component or an electrode monolayer-forming slurry of the same component including the same, there is an effect in forming an electrode active material layer having a porosity gradient between the electrode monolayers.

Furthermore, as described above, the upper monolayer may increase in porosity by using active material particles having a larger particle size than the lower monolayer.

Furthermore, the present disclosure provides a lithium secondary battery manufactured by encapsulating the negative electrode and the positive electrode having the aforementioned features and a separator and an electrolyte in a battery case by a common method.

The secondary battery according to the present disclosure has high energy density, high output characteristics, and improved safety and stability, and can be preferably used, especially, as a constituent cell of medium- and large-sized battery modules. Accordingly, the present disclosure provides medium- and large-sized battery modules including the secondary battery as a unit cell.

The medium- and large-sized battery modules may be preferably applied to a power source requiring high output and high capacity such as electric vehicle, hybrid electric vehicle and power storage system.

Hereinafter, examples are described in detail to provide a detailed explanation of the present disclosure. However, the examples according to the present disclosure may be modified in many other forms, and the scope of the present disclosure is not limited to the examples described below.

Example 1

Binder PVdF, positive electrode active material NiMnCo three-component system compound ($LiNi_{1/3}Co_{1/3}Mn_{1/3}O_2$), and conductive material (Super-P 65) were mixed at 90:5:5 ratio on the basis of weight to prepare a positive electrode slurry. The positive electrode slurry was applied all over aluminum to 100 μm thickness, dried in a 120° C. vacuum oven, and pressed to form a first active material monolayer. The porosity of the first active material monolayer was 25%. Subsequently, water-borne CMC was applied onto the first active material monolayer and dried to form a barrier layer having about 2 μm thickness. The positive electrode slurry was applied to the upper surface of the barrier layer to 100 μm thickness, dried in a 120° C. vacuum oven, and pressed to form a second active material monolayer. In this instance, the total porosity of the positive electrode was 30%, the porosity of the first active material monolayer was about 25%, and the porosity of the second active material monolayer was about 35%. Negative electrode active material natural graphite, conductive material Super-P 65, and binder CMC/SBR were mixed at 98:1:'1 to prepare a slurry, and the negative electrode slurry mixture was coated on a copper foil for a metal current collector, and dried in a 120° C. vacuum oven for 2 hours or longer to manufacture a positive electrode. With the negative electrode and the positive electrode manufactured as above and a polyolefin separator interposed between the negative electrode and the positive electrode, a solution of ethylenecarbonate (EC) and dimethylcarbonate (DMC) at 1:1 volume ratio containing 1M $LiPF_6$ dissolved therein was injected, to produce a pouch cell. Using the produced pouch cell, resistance was measured with the increasing current at the same voltage.

Comparative Example 1

Binder PVdF, positive electrode active material NiMnCo three-component system compound ($LiNi_{1/3}Co_{1/3}Mn_{1/3}O_2$) and conductive material (Super-P 65) were mixed at 90:5:5 ratio on the basis of weight to prepare a positive electrode slurry. The positive electrode slurry was applied to an aluminum current collector to 100 μm thickness, dried in a 120° C. vacuum oven, and pressed to form a first active material monolayer. In this instance, the porosity of the first active material monolayer was 25%. Subsequently, water-borne CMC was applied onto the first active material monolayer and dried to form a barrier layer having about 2 μm thickness. The positive electrode slurry was applied to the upper surface of the barrier layer to 100 μm thickness, dried in a 120° C. vacuum oven, and pressed to form a second active material monolayer. In this instance, the total porosity of the positive electrode was 30%, the porosity of the first active material monolayer was about 35%, and the porosity of the second active material monolayer was about 25%. Negative electrode active material natural graphite, conductive material Super-P65, and binder CMC/SBR were mixed at 98:1:1 to prepare a slurry, and the negative electrode slurry mixture was coated on a copper foil for a metal current collector, and dried in a 120° C. vacuum oven for 2 hours or longer to manufacture a negative electrode. With the negative electrode and the positive electrode manufactured as above and a polyolefin separator interposed between the negative electrode and the positive electrode, a solution of ethylenecarbonate (EC) and dimethylcarbonate (DMC) at 1:1 volume ratio containing 1M $LiPF_6$ dissolved therein was injected, to produce a pouch cell. Using the produced pouch cell, resistance was measured with the increasing current at the same voltage.

Experiment Results

Figure 6:
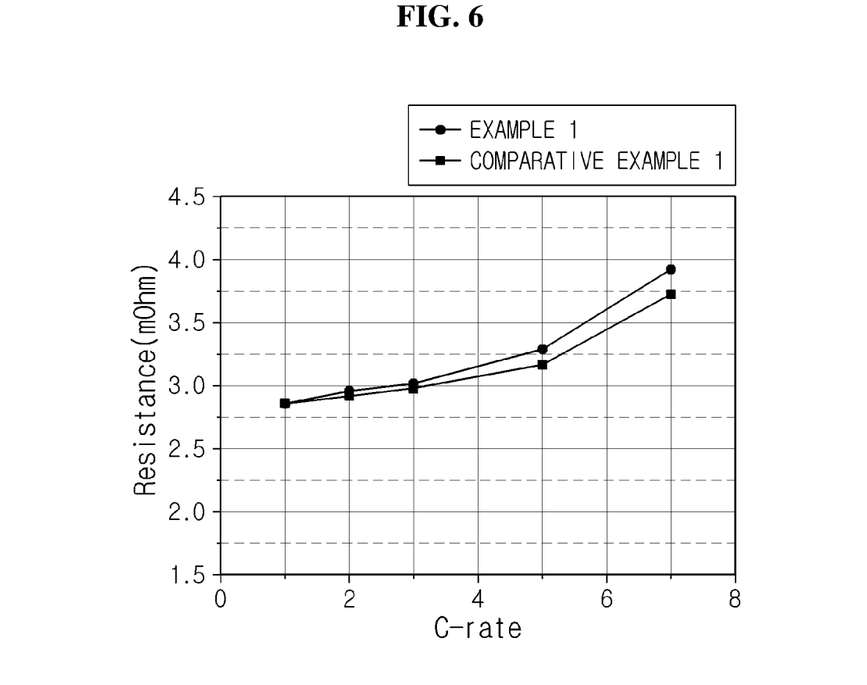
FIG. 6 shows the resistance increase rate test results of example and comparative example according to the present disclosure.

Using the pouch cells obtained in example 1 and comparative example 1, resistance was measured with the increasing current at the same voltage. FIG. 6 plots the experiment results. Referring to FIG. 6, it can be seen that the resistance value is found equal at low current, and as the current increases, the pouch cell according to comparative example 1 increases in resistance as compared to the cell of example 1. It is thought that low porosity of the electrode surface makes electrolyte solution introduction difficult.

What is claimed is:

1. An electrode for an electrochemical device, comprising:
 an electrode current collector and an electrode active material layer formed on at least one surface of the electrode current collector,
 wherein the electrode active material layer includes an electrode active material and has porosity of from 20% to 55%, and
 the electrode active material layer has a layered structure in which a plurality of active material sublayers is stacked on one another, with a barrier layer including polymer resin between each active material sublayer,
 wherein the electrode active material layer increases in porosity at least one of stepwise or gradually from a surface of the electrode current collector along a thickness direction of the electrode active material layer.

2. The electrode for an electrochemical device according to claim 1, wherein the electrode active material layer comprises:
 a lowermost active material sublayer disposed on a surface of the electrode current collector; and
 an nth active material sublayer or an uppermost active material sublayer, where n is an integer greater than 1, so that n active material sublayer are stacked in the electrode active material layer in a sequential order, and porosity increases at least one of stepwise or gradually from the lowermost active material sublayer toward the uppermost active material sublayer along a thickness direction of the electrode active material layer.

3. The electrode for an electrochemical device according to claim 2, wherein the lowermost active material sublayer has porosity of between 20% and 40%.

4. The electrode for an electrochemical device according to claim 2, wherein the uppermost active material sublayer has porosity of between 30% and 50%.

5. The electrode for an electrochemical device according to claim 2, wherein 90% or more of pores in the uppermost active material sublayer have a pore diameter of between 10 μm and 20 μm on the basis of longest pore diameter.

6. The electrode for an electrochemical device according to claim 2, wherein the electrode active material layer has a press strength of particles increasing at least one of stepwise or gradually from the lowermost electrode sublayer toward the uppermost active material sublayer along a thickness direction of the electrode active material layer.

7. The electrode for an electrochemical device according to claim 2, wherein the electrode active material layer has a diameter of particles increasing stepwise and/or gradually from the lowermost electrode sublayer toward the uppermost electrode sublayer along a thickness direction of the electrode active material layer.

8. The electrode for an electrochemical device according to claim 1, wherein the barrier layer includes at least one polymer resin selected from the group consisting of styrenebutadiene rubber, acrylonitrile-butadiene rubber, acrylonitrile-butadiene-styrene rubber, carboxymethylcellulose (CMC), hydroxyropylmethylcellulose, polyvinylalcohol, hydroxypropylcellulose, and diacetylcellulose.

9. The electrode for an electrochemical device according to claim 1, wherein the barrier layer has a thickness of between 0.5 μm and 5 μm.

10. The electrode for an electrochemical device according to claim 8, wherein the polymer resin has a glass transition temperature of between −60° C. and 55° C.

11. The electrode for an electrochemical device according to claim 8, wherein the polymer resin has a boiling point of between 160° C. and 250° C.

12. An electrode assembly for an electrochemical device, comprising a negative electrode, a positive electrode, and a separator interposed between the negative electrode and the positive electrode, wherein the negative electrode and/or the positive electrode is defined in one of claim 1.

13. An electrochemical device comprising the electrode assembly defined in claim 12.

14. A method for manufacturing the electrode of claim 1, comprising:
 forming a first active material sublayer on a surface of the electrode current collector by applying a slurry to the surface of the electrode current collector and drying the slurry to form the first electrode active material sublayer;
 forming a barrier layer on a surface of the active material sublayer;
 forming a second active material sublayer on the surface of the barrier layer by applying a slurry on a surface of the barrier layer, drying the slurry, and pressing the dried slurry to form the second electrode active material sublayer.

15. The method for manufacturing an electrode for an electrochemical device according to claim 14, wherein the pressing of the dried slurry is performed by a hot pressing method under condition of between 80° C. and 120° C.

16. The method for manufacturing an electrode for an electrochemical device according to claim 14, wherein porosity of the first electrode active material sublayer is lower than porosity of the second electrode active material sublayer.

* * * * *